US008781483B2

(12) United States Patent
Ch'ng (10) Patent No.: US 8,781,483 B2
(45) Date of Patent: Jul. 15, 2014

(54) CONTROLLING ACCESS TO PRIVATE ACCESS POINTS FOR WIRELESS NETWORKING

(75) Inventor: Shi Baw Ch'ng, North Billerica, MA (US)

(73) Assignee: Airvana LP, Chelmsford, MA (US)

( * ) Notice: Subject to any disclaimer, the term of this patent is extended or adjusted under 35 U.S.C. 154(b) by 1045 days.

(21) Appl. No.: 11/735,073

(22) Filed: Apr. 13, 2007

(65) Prior Publication Data

US 2008/0254792 A1    Oct. 16, 2008

(51) Int. Cl.
*H04W 72/00* (2009.01)
(52) U.S. Cl.
USPC ........ 455/450; 455/11.1; 455/41.1; 455/41.2; 455/466
(58) Field of Classification Search
USPC ............ 455/426.1, 466, 450, 11.1, 41.1, 41.2
See application file for complete search history.

(56) References Cited

U.S. PATENT DOCUMENTS

| 6,529,491 | B1 * | 3/2003 | Chang et al. ................... 370/335 |
| 6,711,144 | B1 | 3/2004 | Kim et al. |
| 6,731,618 | B1 | 5/2004 | Chung et al. |
| 6,741,862 | B2 | 5/2004 | Chung et al. |
| 6,781,999 | B2 | 8/2004 | Eyuboglu et al. |
| 7,170,871 | B2 | 1/2007 | Eyuboglu et al. |
| 7,200,391 | B2 | 4/2007 | Chung et al. |
| 7,242,958 | B2 | 7/2007 | Chung et al. |
| 7,277,446 | B1 | 10/2007 | Abi-Nassif et al. |
| 7,299,278 | B2 | 11/2007 | Ch'ng |
| 7,558,356 | B2 | 7/2009 | Pollman et al. |
| 7,558,588 | B2 | 7/2009 | To et al. |
| 7,603,127 | B2 | 10/2009 | Chung et al. |
| 7,899,706 | B1 * | 3/2011 | Stone et al. ................. 705/14.55 |
| 2002/0196749 | A1 | 12/2002 | Eyuboglu et al. |
| 2003/0100311 | A1 | 5/2003 | Chung et al. |
| 2003/0100320 | A1 * | 5/2003 | Ranjan .......................... 455/466 |
| 2005/0213555 | A1 | 9/2005 | Eyuboglu et al. |
| 2005/0228723 | A1 * | 10/2005 | Malik .............................. 705/26 |
| 2005/0243749 | A1 | 11/2005 | Mehrabanzad et al. |
| 2005/0245279 | A1 | 11/2005 | Mehrabanzad et al. |

(Continued)

FOREIGN PATENT DOCUMENTS

| EP | 0643543 | 8/1994 |
| GB | 2452688 | 3/2009 |
| GB | 2461444 | 1/2010 |
| WO | WO2008/128040 | 10/2008 |

OTHER PUBLICATIONS

International Search Report and Written Opinion mailed Sep. 15, 2008 in corresponding PCT application No. PCT/US2008/060030 (26 pages).

(Continued)

*Primary Examiner* — Lester Kincaid
*Assistant Examiner* — Dung Lam
(74) *Attorney, Agent, or Firm* — Fish & Richardson P.C.

(57) ABSTRACT

An invitation to use a personal access point to access a wireless network is transmitted to an access terminal. An indication that the invitation has been accepted is received and the personal access point is authorized to provide the access terminal with access to the network.

At an access terminal, an invitation to use a personal access point to access a wireless network is received, an instruction to accept the invitation is received from an operator of the access terminal, and an acceptance of the invitation is communicated.

35 Claims, 3 Drawing Sheets

(56) References Cited

U.S. PATENT DOCUMENTS

| | | | |
|---|---|---|---|
| 2006/0067422 A1 | 3/2006 | Chung | |
| 2006/0067451 A1 | 3/2006 | Pollman et al. | |
| 2006/0074765 A1* | 4/2006 | Crawford et al. | 705/26 |
| 2006/0121916 A1* | 6/2006 | Aborn et al. | 455/456.5 |
| 2006/0126509 A1 | 6/2006 | Abi-Nassif et al. | |
| 2006/0159045 A1 | 7/2006 | Ananthaiyer et al. | |
| 2006/0184997 A1* | 8/2006 | La Rotonda et al. | 726/2 |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Palnati et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Sharma et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0195741 A1* | 8/2008 | Wynn et al. | 709/229 |
| 2008/0253550 A1 | 10/2008 | Ch'ng et al. | |
| 2008/0254792 A1 | 10/2008 | Ch'ng | |
| 2009/0029728 A1* | 1/2009 | Shen et al. | 455/507 |
| 2009/0034440 A1 | 2/2009 | Samar et al. | |
| 2009/0082020 A1 | 3/2009 | Ch'ng et al. | |
| 2009/0088155 A1 | 4/2009 | Kim | |
| 2009/0116445 A1 | 5/2009 | Samar et al. | |
| 2009/0154447 A1 | 6/2009 | Humblet | |
| 2009/0156165 A1 | 6/2009 | Raghothaman et al. | |
| 2009/0156195 A1 | 6/2009 | Humblet | |
| 2009/0156218 A1 | 6/2009 | Garg et al. | |
| 2009/0163202 A1 | 6/2009 | Humblet et al. | |
| 2009/0163216 A1 | 6/2009 | Hoang et al. | |
| 2009/0163238 A1 | 6/2009 | Rao et al. | |
| 2009/0164547 A1 | 6/2009 | Ch'ng et al. | |
| 2009/0168766 A1 | 7/2009 | Eyuboglu et al. | |
| 2009/0168788 A1 | 7/2009 | Den et al. | |
| 2009/0170440 A1 | 7/2009 | Eyuboglu et al. | |
| 2009/0170475 A1 | 7/2009 | Ch'ng et al. | |
| 2009/0170520 A1 | 7/2009 | Jones | |
| 2009/0170547 A1 | 7/2009 | Raghothaman et al. | |
| 2009/0172169 A1 | 7/2009 | Ramaswamy et al. | |
| 2009/0172397 A1 | 7/2009 | Kim | |
| 2009/0186626 A1 | 7/2009 | Raghothaman et al. | |
| 2009/0262697 A1 | 10/2009 | To et al. | |
| 2009/0327713 A1* | 12/2009 | Marin et al. | 713/168 |
| 2010/0272100 A1* | 10/2010 | Buckley | 370/352 |

OTHER PUBLICATIONS

International Preliminary Report on Patentability mailed Oct. 22, 2009 in corresponding PCT application No. PCT/US2008/060030 (11 pages).

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

3rd Generation Partnership Project 2 "3GPP2", "cdma2000 High Rate Packet Data Interface Specification", C.S0024-A, version 1, Mar. 2004 (1083 pages).

Examination Report from corresponding United Kingdom application No. GB0918096.9 mailed Aug. 19, 2011 (2 pages).

Response to Examination Report from corresponding United Kingdom application No. GB0918096.9 mailed May 5, 2011, filed on Jul. 4, 2011, 10 pages.

Examination Report from corresponding United Kingdom application No. GB0918096.9 mailed May 5, 2011 (3 pages).

* cited by examiner

CONTROLLING ACCESS TO PRIVATE ACCESS POINTS FOR WIRELESS NETWORKING

BACKGROUND

This disclosure relates to controlling access to private access points for wireless networking.

Figure 1:
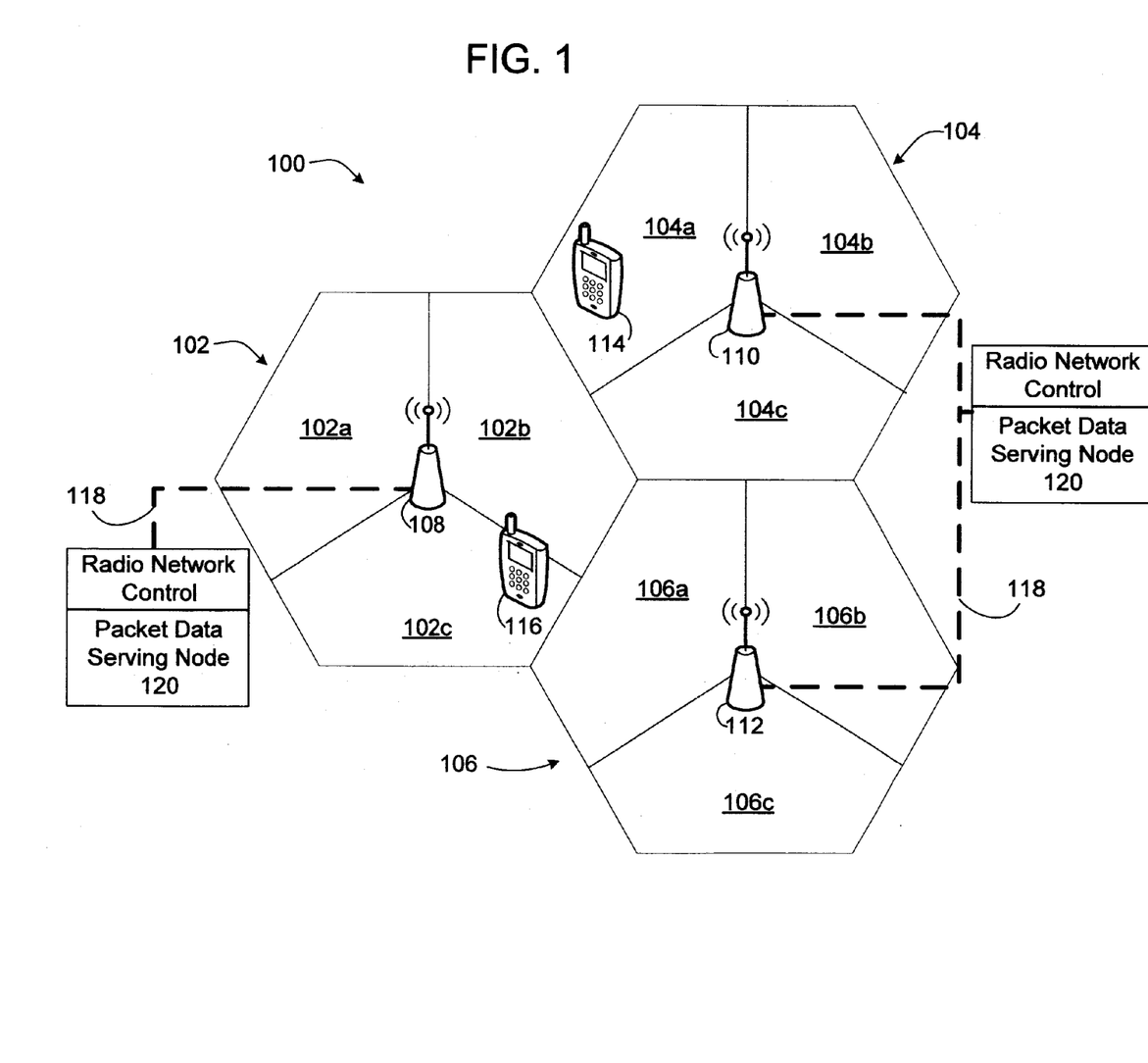
FIG. 1 is a block diagram of a radio access network.

Cellular wireless communications systems are designed to serve many access terminals distributed in a large geographic area by dividing the area into cells, as shown in FIG. 1. At or near the center of each cell 102, 104, 106, a radio network access point 108, 110, 112, also referred to as a base transceiver station (BTS), is located to serve access terminals 114, 116 (e.g., cellular telephones, laptops, PDAs) located in the cell. Each cell is often further divided into sectors 102a-c, 104a-c, 106a-c by using multiple sectorized antennas. A BTS is identified by one or more of several properties, which may include the phase offset of its pilot signal (PN offset), a frequency, an IP address, or a SectorID. In each cell, that cell's radio network access point may serve one or more sectors and may communicate with multiple access terminals in its cell.

The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B and is also incorporated herein by reference. Other wireless communication protocols may also be used.

SUMMARY

In general, in one aspect, an invitation to use a personal access point to access a wireless network is transmitted to an access terminal. An indication that the invitation has been accepted is received and the personal access point is authorized to provide the access terminal with access to the network.

Implementations may include one or more of the following features. The invitation uniquely identifies the base station. Authorizing the personal access point to provide the access terminal with access to the network includes adding the access terminal to a list of access terminals authorized to access the network through the personal base station. A second indication withdrawing acceptance of the invitation is received and the personal access point is deauthorized from providing the access terminal with access to the network. An identification of the personal access point is added to a list of access points the access terminal is authorized to use to access the wireless network. A second indication is received withdrawing acceptance of the invitation, and the identification of the personal access point is removed from the list of access points the access terminal is authorized to use to access the wireless network. Transmitting the invitation includes transmitting a text message conveying the invitation. Receiving the indication includes receiving a text message conveying the indication. Receiving the second indication includes receiving a text message conveying the second indication. After an expiration time, the personal access point is deauthorized from providing the access terminal with access to the network. The expiration time is associated with the invitation. The expiration time is included in the indication that the invitation has been accepted. Transmitting the invitation includes generating a token and transmitting the token to the access terminal, and receiving the indication that the invitation has been accepted includes receiving a message from the access terminal including a second token corresponding to the result of performing a mathematical operation on the first token.

In general, in one aspect, an invitation to use a personal access point to access a wireless network is transmitted to an access terminal. Before an expiration time passes, an indication that the invitation has been accepted is received, and the personal access point is authorized to provide the access terminal with access to the network.

In general, in one aspect, an invitation to use a personal access point to access a wireless network is transmitted to an access terminal, an indication that the invitation has been accepted is received, it is confirmed that the indication was received from the access terminal, and the personal access point is authorized to provide the access terminal with access to the network.

Implementations may include one or more of the following features. The confirming includes, in response to receiving the indication that the owner of the access terminal has accepted the invitation, transmitting a confirmation message to the access terminal and receiving a message in response to the confirmation message. The confirming includes, in response to receiving the indication that the owner of the access terminal has accepted the invitation, generating a token and transmitting the token to the access terminal, and receiving a message based on the token from the access terminal. Receiving the message based on the token includes receiving a message including a second token corresponding to the result of performing a mathematical operation on the first token.

In general, in one aspect, at an access terminal, an invitation to use a personal access point to access a wireless network is received, an instruction to accept the invitation is received from an operator of the access terminal, and an acceptance of the invitation is communicated.

Implementations may include one or more of the following features. Communicating the acceptance of the invitation includes performing a mathematical operation on a first token associated with the invitation to form a second token and transmitting the second token to a source of the invitation. Communicating the acceptance of the invitation includes transmitting an indication that the operator accepts the invitation, receiving a first token, performing a mathematical operation on the first token to form a second token, and transmitting the second token to a source of the first token. An identification of the personal access point is added to a list of access points maintained in a memory of the access terminal. Receiving the instruction includes accessing a memory of the access terminal in which the instruction is stored.

In general, in one aspect, a text message is received that includes instructions for controlling access to a component of a wireless network, and the instructions are automatically implemented.

Advantages include providing the user of an access terminal the ability to control which personal access the access terminal uses to access the wireless network, increasing security. The authenticity of the user's authorization can be confirmed. Malicious users are prevented from using personal access points to intercept others' information.

Other aspects may include these and other features and aspects, alone and in other combinations, expressed as apparatus, methods, program products, means for performing functions, and systems, and in other ways.

Other features and advantages will be apparent from the description and the claims.

DESCRIPTION

Referring to FIG. 1, a radio access network (RAN) 100 uses an Ev-DO protocol to transmit data packets between an access terminal, e.g., access terminal 114 and 116, and a radio network access point, e.g., access points 108, 110, 112. The access points are connected over a backhaul connection 118 to radio network control / packet data serving nodes (RNC/PDSN) 120, which may be one or more physical devices at different locations. Although this description uses terminology from EV-DO standards, the same concepts are applicable to other communication methods, including GSM, UMTS, HSDPA, WiMAX®, WiBro®, WiFi®, and the like.

Figure 2:
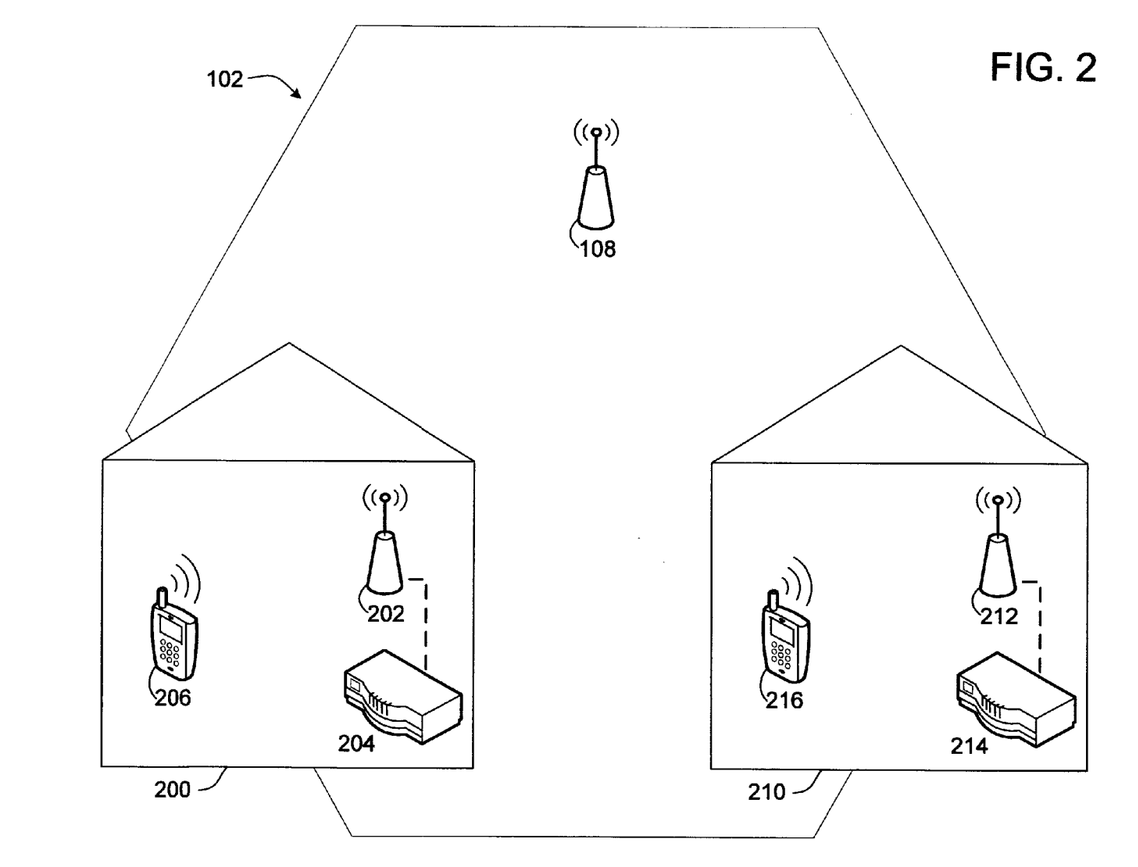
FIG. 2 is a block diagram of a home networking deployment.

In some examples, as shown in FIG. 2, a radio network access point 202 may be deployed in a user's home 200 in a similar manner as a WiFi® access point. Such a radio network access point is referred to as a private access point. The private access point 202 may use an available high-speed internet connection, such as DSL or cable modem 204, as the backhaul with the RNC/PDSN functionality implemented in the private access point 202. Such a private access point may be installed anywhere that it is advantageous to do so, for example, in an office, a public space, or a restaurant. When this description refers to a private access point being in a "home," that encompasses any such location. One respect in which a private access point may be considered different from a picocell access point is that the private access point may be intended to provide access only for the user who installs it in his home or those he authorizes, while a picocell may serve a similar venue but provide access to any subscriber of the network. In some examples, a private access point may be integrated into a cable modem or other network hardware, such as a router or WiFi® access point.

When an authorized access terminal 206 is present inside the home (or anywhere within range of the private access point 202), it may use the private access point 202 rather than a regular cellular radio network access point such as access point 108 to place or receive voice calls and data connections, even if the access terminal is otherwise within the cell 102 for that access point 108. We sometimes refer to the standard access point 108 as a macro access point or macro BTS to distinguish it from a private access point, as it provides direct access to the wider RAN.

A neighboring home 210 may have its own private access point 212 connected to its cable modem 214 for use by its owner's access terminal 216. One respect in which a private access point deployment may be different from traditional radio network deployment is that neighboring private access points are intended to operate independently, in part because real-time communications is difficult between neighboring private access points. one respect in which the intended private access point deployment may also be different from a WiFi® deployment is that private access points are intended to operate in a licensed spectrum. Some details and examples are discussed in co-pending applications Ser. No. 11/640,501, titled Provisioning Private Access Points for Wireless Networking, and Ser. No. 11/640,503, titled Configuring Preferred User Zone Lists for Private Access Points for Wireless Networking, both filed Dec. 15, 2006, and incorporated here by reference.

Access lists of authorized access terminals for each private access point can be configured on a central server and distributed to the private access points. Information to locate and access the private access points can be distributed to access terminals using an over-the-air parameter administration (OTAPA) system. Access terminals may also retrieve access information from the configuration server themselves.

In a traditional cellular network, the network informs the access terminals about which access points are available to them, and software in the access terminals decides which of the available access points the access terminal should use. Because personal access points are not under the physical control of the network operator, such access points may be maliciously modified (e.g., by their owners) to inappropriately monitor or intercept calls made by access terminals that are using the access points to access the network. The system described below can prevent interception and other bad acts by giving access terminal operators control over which access points their access terminals use to access the network.

Figure 3:
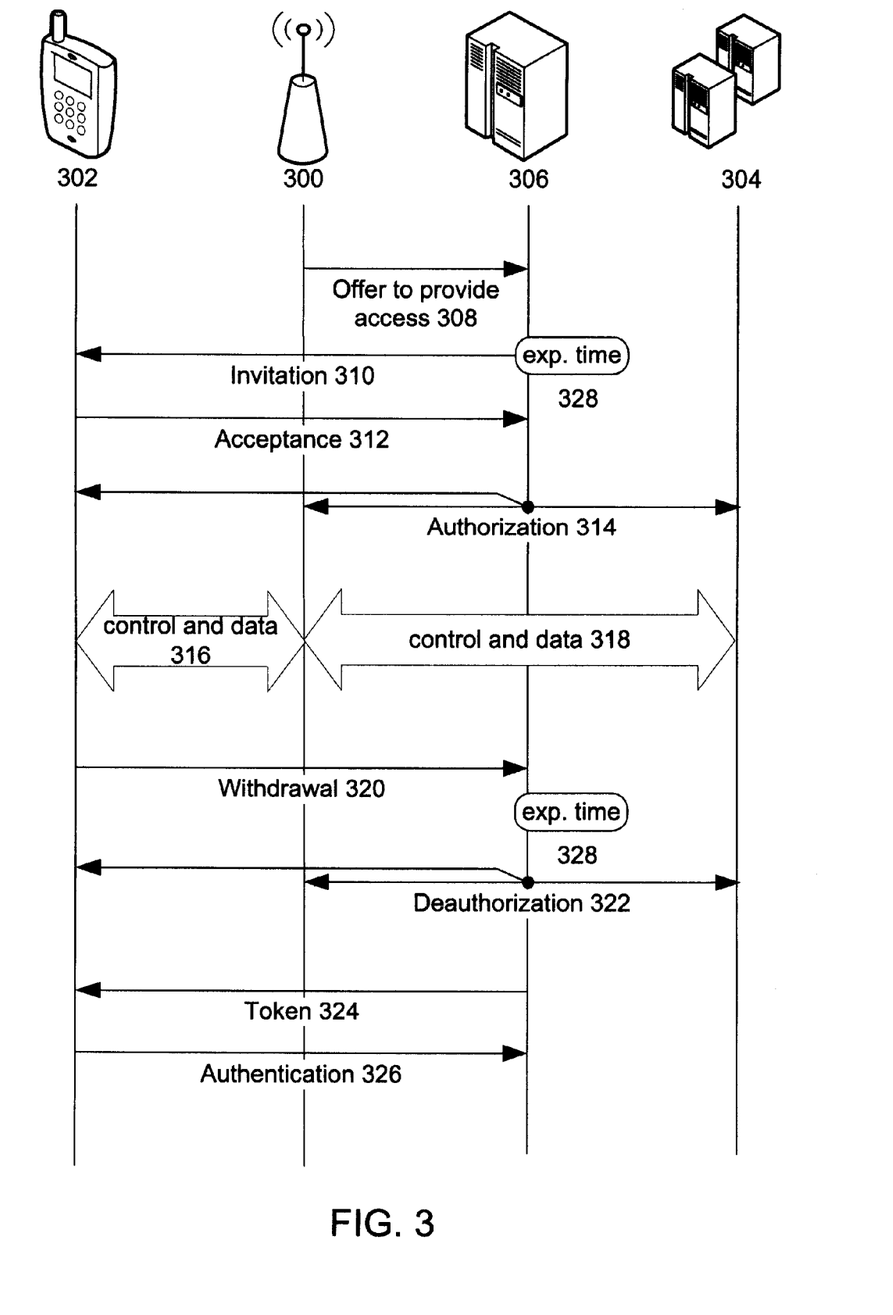
FIG. 3 is a sequence diagram of an access control system

As shown in FIG. 3, before an access terminal uses an unfamiliar personal base station, a series of messages are exchanged. These are described here as SMS (simple message system) messages, a standard form of short text messaging, but any system for passing messages between access terminals and other network components may be used. SMS message have the advantage that users are familiar with them, existing global network infrastructures already support them, and special software is not needed for most access terminals to send and receive them. In FIG. 3, the user's cell phone 302 and personal access point 300 correspond to the access terminals 206, 216 and access points 204, 214, in FIG. 2. An SMS application server 306 is a network component that sends and receives SMS messages to and from access terminals like cell phone 302 and relays appropriate command and control messages to other network components that may not communicate by SMS, such as the personal access point 300 and the radio network controller and other network controllers 304.

In the example of FIG. 3, the access point 300 sends a message 308 to the SMS application server 306 (or to an intermediate network management component) that it is available to provide the cell phone 302 with access to the network. The SMS application server 306 sends an invitation 310 to the cell phone 302 inviting it to use the access point 300. In some examples, the invitation includes information that uniquely identifies the access point 300. There may be both a human-readable identification, such as "Bob's house," and a machine-readable identification, such as a hexadecimal address of the access point's network interface or a numerical SectorID, or any other number or value that uniquely identifies the access point. In some examples, the personal access point 300 may be equipped to send the invitation directly to the user's cell phone 302.

If the user accepts the invitation, the cell phone 302 sends an acceptance 312 back to the SMS application server 306. The acceptance may simply be a reply SMS message with no new content, or it may include additional information. The additional information may include a time limit that the cell phone's operator wants to place on the acceptance, or whether it is a permanent acceptance or the owner wants the opportunity to accept or decline an invitation every time he uses the access point 300. In cases where the invitation is sent directly to the user's cell phone 302 from the access point 300, the acceptance may still be sent to the SMS application server 306 so that, for example, the network operator can maintain control over which access terminals use which access points. For example, the network operator may not trust personal access points to maintain their own access controls. In some examples, the user of the cell phone 302 may have pre-configured the phone to automatically accept some or all invitations. In some examples, the user may be required to not only affirmatively accept an invitation but to provide a password or some other authentication before doing so.

Upon receiving the acceptance 312, the SMS application server 306 communicates an authorization 314 to the access point 300 or to the other network components 304. The authorization may be an instruction to add the cell phone 302 to a list of access terminals that are authorized to use the access point 300. This list is referred to as an access list. The access list may be stored at the access point itself or at another network component. Maintaining control of which access terminals may use a given personal access point at a location other than the access point itself has the advantage of preventing the access point's owner from modifying the access list so that the access point will provide access to access terminals that it is not authorized to serve.

In some examples, the SMS application server 306 does not make the determination that the authorization should be issued. Instead, the SMS application server 306 relays the details of the acceptance (or the acceptance itself) to another network component to make that determination. The authorization 314 may also be communicated to the cell phone 302, for example, to confirm that the acceptance 312 was validated and it is now authorized to use the access point 300. Control of whether the user's cell phone 302 (and other access terminals) can use the personal access point 300 (and other similar access points) may be maintained in several ways. Lists may be maintained indicating which access terminals may use a given access point, which access points may service a given access terminal, or conditions under which a given access terminal may use a given access point. Such lists may be maintained on the access terminals, the access points, or on other network components. For example, a list of which access terminals to provide with network access may be maintained on the personal access point 300. If the network operator does not want to maintain the list at the personal access point (e.g., because it does not trust access points it does not directly control or because it is too costly or difficult to update lists on access points), it may maintain such a list at the radio network controller or at some other component of the network.

Once the access point 300 has been authorized to provide the cell phone 302 with access to the network, control and data signals 316 and 318 are passed between the cell phone 302 and the access point 300 and between the access point 300 and the other network components 304.

In some examples, an expiration time 328 is associated with the invitation 310 or authorization 314. The expiration time may be a time within which the user of the cell phone 302 must accept the invitation or it may be a time at which the authorization will end, with or without a limit on when the invitation is accepted. The user of the cell phone 302 may also withdraw his acceptance of the invitation by sending a withdrawal message 320. This message could be a SMS message sent in reply to the original invitation 310, if the cell phone 302 retained a copy of it, or it could be an original message, for example, one identifying the access point 300 by name and including a command to stop using that access point. In response to an express withdrawal or the expiration of a time limit or other condition, the SMS server 306 or another network component 304 will send a deauthorization command 322 to tell the access point 300, cell phone 302, or any other network components that need to know that the access point 300 is no longer authorized to serve the cell phone 302. As with the authorization 314, the deauthorization 322 may originate from network components 304 other than the SMS application server 306.

In some examples, the authenticity of the acceptance 312 received from the access terminal may be verified. This may be used to prevent malicious operators of personal access points from spoofing the acceptance message. As shown in FIG. 3, the SMS application server 306 may generate a token 324 and send it to the user's cell phone 302. This token 324 may be included in the original invitation 310 or may be sent in a challenge message sent in response to receiving the acceptance 312. The user's cell phone confirms the authenticity of the acceptance by returning the token in an authentication message 326. This may simply involve returning the same token 324 in a SMS message, if the SMS application server can be confident that the challenge message was sent to the real cell phone 302. If greater security is needed, the user's cell phone 302 may be required to modify the token 324 in a unique way, such as by encrypting it using a private key or a shared secret key. The authentication 326 may be included in the original acceptance message 312, if the token 324 was included in the invitation 310.

Although the techniques described above employ the 1xEV-DO air interface standard, the techniques are also applicable to other CDMA and non-CDMA air interface technologies in which messages can be passed between access terminals and other network components.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims and other claims to which the applicant may be entitled. The following are examples for illustration only and not to limit the alternatives in any way. The techniques described herein can be performed in a different order and still achieve desirable results.

What is claimed is:

1. A method comprising:
receiving, from a personal access point, a message that the personal access point is available to provide an access terminal with access to a wireless network;
transmitting, by an SMS server, to the access terminal in response to receiving the message, an SMS invitation to use the personal access point to access the wireless network, the invitation comprising an associated expiration time that defines a time during which the invitation can be accepted;
receiving, in response to the invitation and prior to a passing of the expiration time, an indication that the invitation has been accepted, the indication comprising a limit, defined by the access terminal, on a length of time for which the indication is valid; and
authorizing the personal access point to provide the access terminal with access to the network based at least in part on the indication and the limit.

2. The method of claim 1 in which the invitation uniquely identifies the personal access point.

3. The method of claim 1 in which authorizing the personal access point to provide the access terminal with access to the network comprises adding the access terminal to a list of access terminals authorized to access the network through the personal access point.

4. The method of claim 1 also comprising:
receiving a second indication withdrawing acceptance of the invitation; and
deauthorizing the personal access point from providing the access terminal with access to the network.

5. The method of claim 4 in which receiving the second indication comprises receiving a text message conveying the second indication.

6. The method of claim 1 also comprising:
adding an identification of the personal access point to a list of access points the access terminal is authorized to use to access the wireless network.

7. The method of claim 6 also comprising:
receiving a second indication withdrawing acceptance of the invitation; and
removing the identification of the personal access point from the list of access points the access terminal is authorized to use to access the wireless network.

8. The method of claim 1 in which transmitting the invitation comprises transmitting a text message conveying the invitation.

9. The method of claim 1 in which receiving the indication comprises receiving a text message conveying the indication.

10. The method of claim 1 also comprising:
after the expiration time has passed, deauthorizing the personal access point from providing the access terminal with access to the network.

11. The method of claim 10 in which the expiration time is associated with the invitation.

12. The method of claim 10, wherein the indication further comprises a second expiration time.

13. The method of claim 1 in which
transmitting the invitation includes generating a token and transmitting the token to the access terminal; and
receiving the indication that the invitation has been accepted includes receiving a message from the access terminal comprising a second token corresponding to the result of performing a mathematical operation on the first token.

14. A method comprising:
receiving, from a personal access point, a message that the personal access point is available to provide an access terminal with access to a wireless network;
transmitting, by an SMS server, to the access terminal in response to receiving the message, a first short message service (SMS) message comprising an SMS invitation to use the personal access point to access the wireless network, the invitation having an associated expiration time that defines a time during which the invitation can be accepted;
receiving, in response to the invitation and prior to a passing of the expiration time, a second SMS message comprising an indication that the invitation has been accepted, the indication comprising a limit, defined by the access terminal, on a length of time for which the indication is valid; and authorizing the personal access point to provide the access terminal with access to the network based at least in part on the indication and the limit.

15. A method comprising:
receiving, from a personal access point, a message that the personal access point is available to provide an access terminal with access to a wireless network;
transmitting, by an SMS server, to the access terminal in response to receiving the message, an SMS invitation to use the personal access point to access the wireless network, the invitation having an associated expiration time that defines a time during which the invitation can be accepted;
receiving, in response to the invitation and prior to a passing of the expiration time, an indication that the invitation has been accepted, the indication comprising a limit, defined by the access terminal, on a length of time for which the indication is valid;
confirming that the indication was received from the access terminal; and
authorizing the personal access point to provide the access terminal with access to the network based at least in part on the indication and the limit.

16. The method of claim 15 in which the confirming comprises:
in response to receiving the indication that the owner of the access terminal has accepted the invitation, transmitting a confirmation message to the access terminal; and
receiving a message in response to the confirmation message.

17. The method of claim 15 in which the confirming comprises:
in response to receiving the indication that the owner of the access terminal has accepted the invitation:
generating a token;
transmitting the token to the access terminal; and
receiving a message based on the token from the access terminal.

18. The method of claim 17 in which receiving the message based on the token comprises receiving a message comprising a second token corresponding to the result of performing a mathematical operation on the first token.

19. A method performed on an access terminal, the method comprising:
receiving, from an SMS server, an SMS invitation to use a personal access point to access a wireless network, the invitation having an associated expiration time that defines a time during which the invitation can be accepted;
receiving, in response to the invitation and prior to a passing of the expiration time, an instruction from an operator of the access terminal to accept the invitation; and
communicating an indication that comprises an acceptance of the invitation, the indication comprising a limit, defined by the access terminal, on a length of time for which the indication is valid.

20. The method of claim 19 in which communicating the acceptance of the invitation comprises:
performing a mathematical operation on a first token associated with the invitation to form a second token; and
transmitting the second token to a source of the invitation.

21. The method of claim 19 in which communicating the acceptance of the invitation comprises:
transmitting an indication that the operator accepts the invitation;
receiving a first token;
performing a mathematical operation on the first token to form a second token; and
transmitting the second token to a source of the first token.

22. The method of claim 19 also comprising:
adding an identification of the personal access point to a list of access points maintained in a memory of the access terminal.

23. The method of claim 19 in which the invitation uniquely identifies the personal access point.

24. The method of claim 19 in which receiving the instruction comprises accessing a memory of the access terminal in which the instruction is stored.

25. An apparatus comprising:
a computing device connected to a radio access network and configured to:
receive, from a personal access point, a message that the personal access point is available to provide an access terminal with access to a wireless network;
transmit, by an SMS server, to the access terminal in response to receiving the message, an SMS invitation to use the personal access point to access the wireless network, the
invitation having an associated expiration time that defines a time during which the invitation can be accepted; and
in response to receiving an indication that the invitation has been accepted prior to a passing of the expiration time:
authorize the personal access point to provide the access terminal with access to the wireless network based at least in part on the indication;
wherein the indication comprises a limit, defined by the access terminal, on a length of time for which the indication is valid.

26. The apparatus of claim 25 in which the computing device is also configured to in response to receiving a second indication:
withdrawing acceptance of the invitation and
deauthorize the personal access point from providing the access terminal with access to the network.

27. The apparatus of claim 25 in which the computing device is also configured to:
after the expiration time has passed, deauthorize the personal access point from providing the access terminal with access to the network.

28. An apparatus comprising:
a computing device connected to a radio access network and configured to:
receive, from a personal access point, a message that the personal access point is available to provide an access terminal with access to a wireless network;
transmit, by an SMS server, to the access terminal in response to receiving the message, an SMS invitation to use the personal access point to access the wireless network transmit, to an access terminal, an invitation to use a personal access point to access a wireless network, the invitation having an associated expiration time that defines a time during which the invitation can be accepted; and
in response to receiving an indication that the invitation has been accepted prior to a passing of the expiration time:
confirm that the indication was received from the access terminal; and
authorize the personal access point to provide the access terminal with access to the wireless network based at least in part on the indication;
wherein the indication comprises a limit, defined by the access terminal, on a length of time for which the indication is valid.

29. The apparatus of claim 28 in which the computing device is configured to confirm that the indication was received from the access terminal by:
generating a token;
transmitting the token to the access terminal; and
receiving a message based on the token from the access terminal.

30. An apparatus comprising:
an access terminal for accessing a radio access network and configured to:
receive, from an SMS server, an SMS invitation to use a personal access point to access a wireless network, the invitation having an associated expiration time that defines a time during which the invitation can be accepted;
receive an instruction from an operator of the access terminal to accept the invitation prior to a passing of the expiration time; and
communicate an indication that comprises an acceptance of the invitation, the indication comprising a limit, defined by the access terminal, on a length of time for which the indication is valid;
place a voice call using cellular communication protocols using the access terminal.

31. The apparatus of claim 30 in which the access terminal is configured to communicate an acceptance of the invitation by:
performing a mathematical operation on a first token associated with the invitation to form a second token; and
transmitting the second token to a source of the invitation.

32. The apparatus of claim 30 in which the access terminal is configured to communicate an acceptance of the invitation by:
transmitting an indication that the operator accepts the invitation;
receiving a first token;
performing a mathematical operation on the first token to form a second token; and
transmitting the second token to a source of the first token.

33. A radio access network management system comprising:
an interface for communicating with access points;
an interface for receiving text messages; and
a computing device configured to:
receive, from a personal access point, a message that the personal access point is available to provide an access terminal with access to a wireless network;
transmit, by an SMS server, to the access terminal in response to receiving the message, an SMS invitation to use the personal access point to access the wireless network, the invitation having an associated expiration time that defines a time during which the invitation can be accepted; and
in response to receiving an indication that the invitation has been accepted prior to a passing of the expiration time:
authorize the personal access point to provide the access terminal with access to the network based at least in part on the indication;
wherein the indication comprises a limit, defined by the access terminal, on a length of time for which the indication is valid.

34. A machine-readable storage device encoding instructions that, when executed, cause a computing device connected to a radio access network to:
receive, from a personal access point, a message that the personal access point is available to provide an access terminal with access to a wireless network;
transmit, by an SMS server, to the access terminal in response to receiving the message, an SMS invitation to use the personal access point to access the wireless network, the invitation having an associated expiration time that defines a time during which the invitation can be accepted; and
in response to receiving an indication that the invitation has been accepted prior to a passing of the expiration time:
authorize the personal access point to provide the access terminal with access to the wireless network based at least in part on the indication;
wherein the indication comprises a limit, defined by the access terminal, on a length of time for which the indication is valid.

35. A method comprising:
receiving, from personal access point, a message that the personal access point is available to provide an access terminal with access to a wireless network;
transmit, by an SMS server, to the access terminal in response to receiving the message, an SMS invitation to use the personal access point to access the wireless network transmitting, to an access terminal, an invitation to use a personal access point to access a wireless network;
receiving, in response to the invitation, a short message service (SMS) message comprising:
an indication that the invitation has been accepted, the indication comprising a limit, defined by the access terminal, on a length of time for which the indication is valid; and
instructions for controlling access to a personal access point; and automatically implementing the instructions based at least in part on the indication.

* * * * *

UNITED STATES PATENT AND TRADEMARK OFFICE
CERTIFICATE OF CORRECTION

PATENT NO.         : 8,781,483 B2
APPLICATION NO.    : 11/735073
DATED              : July 15, 2014
INVENTOR(S)        : Ch'ng Page 1 of 1

It is certified that error appears in the above-identified patent and that said Letters Patent is hereby corrected as shown below:

In the Claims

Column 11, Line 18, Claim 30, after "time;" delete "and".

Column 11, Line 22, Claim 30, after "valid;" insert -- and --, therefor.

Signed and Sealed this
Seventh Day of October, 2014

Michelle K. Lee
*Deputy Director of the United States Patent and Trademark Office*